US006001794A

United States Patent [19]

Del Duca et al.

[11] Patent Number: 6,001,794

[45] Date of Patent: *Dec. 14, 1999

[54] LAUNDRY PRETREATMENT PEROXYGEN BLEACH WITH RADICAL SCAVENGER GIVING IMPROVED FABRIC/COLOR SAFETY

[75] Inventors: Valerio Del Duca, Massalubrense; Carlo Ricci; Marina Trani, both of Rome, all of Italy

[73] Assignee: The Procter & Gamble Company, Cincinnati, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/981,950

[22] PCT Filed: Jun. 14, 1996

[86] PCT No.: PCT/US96/10347

§ 371 Date: Mar. 26, 1998

§ 102(e) Date: Mar. 26, 1998

[87] PCT Pub. No.: WO97/02331

PCT Pub. Date: Jan. 23, 1997

[51] Int. Cl.[6] .............................. C09K 15/08; C11D 3/20; C11D 3/39; C11D 3/395

[52] U.S. Cl. .......................... 510/283; 510/284; 510/372; 510/376; 510/309; 252/186.43; 252/404; 8/111

[58] Field of Search ......................... 8/111, 137; 510/283, 510/284, 309, 336, 337, 405, 406, 420, 505; 252/186.26, 186.27, 186.28, 186.43, 404

[56] References Cited

U.S. PATENT DOCUMENTS

| | | | |
|---|---|---|---|
| 4,853,143 | 8/1989 | Hardy et al. . | |
| 4,900,468 | 2/1990 | Mitchell et al. . | |
| 5,149,463 | 9/1992 | Peterson . | |
| 5,180,514 | 1/1993 | Farr et al. . | |
| 5,622,646 | 4/1997 | Scialla et al. . | |
| 5,686,014 | 11/1997 | Baillely et al. | 252/186.33 |

*Primary Examiner*—Margaret Einsmann
*Attorney, Agent, or Firm*—C. Brant Cook; K. W. Zerby; J. C. Rasser

[57] ABSTRACT

The present invention relates to the use of a liquid composition comprising a peroxygen bleach and a radical scavenger or mixtures thereof, for pretreating soiled fabrics before said fabrics are washed, for reducing the loss of tensile strength in said fabrics and/or for reducing the color damage of said fabrics. The present invention further encompasses a liquid composition suitable for pretreating soiled fabrics, said composition comprising a peroxygen bleach and a radical scavenging system.

11 Claims, No Drawings

LAUNDRY PRETREATMENT PEROXYGEN BLEACH WITH RADICAL SCAVENGER GIVING IMPROVED FABRIC/COLOR SAFETY

TECHNICAL FIELD

The present invention relates to the pretreatment of soiled fabrics and to compositions suitable to be used as pretreater.

BACKGROUND

Peroxygen bleach-containing compositions have been extensively described in laundry applications as laundry detergents, laundry additives or even laundry pretreaters.

Indeed, it is known to use such peroxygen bleach-containing compositions in laundry pretreatment applications to boost the removal of encrustated stains/soils which are otherwise particularly difficult to remove, such as grease, coffee, tea, grass, mud/clay-containing soils and the like. However, we have found that a drawback associated with such peroxygen bleach-containing compositions is that said compositions may damage fabrics resulting in tensile strength loss and/or color damage when used in pretreatment application, i.e. when applied directly (neat) onto the fabrics, and left to act onto said fabrics for prolonged periods of time before washing said fabrics.

It is thus an object of the present invention to provide improved fabric safety and/or color safety to fabrics when pretreating said fabrics with peroxygen bleach-containing compositions, especially in those applications where said compositions are left neat into contact with said fabrics for prolonged periods of time before washing said fabrics.

Indeed, when pretreating fabrics with a composition comprising a peroxygen bleach like hydrogen peroxide, it has been found that the presence of metal ions such as copper and/or iron and/or manganese and/or chromium on the surface of said fabrics and/or the exposure to UV radiation from sunlight of said fabrics after having been contacted with said peroxygen bleach-containing composition, produces fabric damage resulting in loss of tensile strength of the fabric fibres and/or in color damage of said fabrics. Indeed, it is speculated that the presence of metal ions such as copper and/or iron and/or manganese and/or chromium on the surface of the fabrics, especially on cellulosic fibres, and/or the exposure of said fabrics to UV radiation from sunlight catalyse the radical decomposition of peroxygen bleaches like hydrogen peroxide. Thus, it is believed that a radical reaction occurs on the surface of the fabric with generation of free radicals, which results in tensile strength loss. Furthermore, it is speculated that this generation of free radicals may further provide an aggressive decomposition of certain dyes present in the fabrics resulting thereby in chemical damage of dye molecules which is visible as discoloration and/or hue change. Dyes commonly present in colored fabrics include metal containing dyes like copper-formazan dyes or metal azo dyes.

Therefore we have found essential that this surface reaction resulting in generation of free radicals is controlled in the pretreatment environment, thereby providing improved safety to fabrics and colors.

It has now been found that this can be achieved by formulating a peroxygen bleach-containing composition which comprises a radical scavenger, or mixtures thereof. More particularly, it has been found that the use of radical scavengers such as substituted mono and dihydroxy benzenes and derivatives thereof, alkyl- and aryl carboxylates or mixtures thereof, in a peroxygen bleach-containing composition, considerably reduces the color damage and/or fabric damage on a fabric pretreated with such a composition. Furthermore, it has been unexpectedly found that the addition, in a peroxygen bleach-containing composition, of a specific mixture of radical scavengers, i.e. the radical scavenging system as defined hereinafter, results in a synergistic effect on fabric safety and color safety when pretreating a soiled fabric with said composition.

An advantage of the present invention is that excellent laundry performance on a broad range of stains and soils such as bleachable stains and/or greasy stains is also provided.

Another advantage of the present invention is that the compositions suitable to be used according to the present invention provide also excellent performance when used in other applications, apart from laundry pretreater application, such as in other laundry applications, as a laundry detergent or laundry additive, or even in hard surface cleaning applications.

EP-B-209 228 discloses compositions comprising a peroxide source like hydrogen peroxide, metal chelating agents such as amino polyphosphonate chelants and free radical scavengers at a level of from 0.005% to 0.04% by weight of the total composition. Said radical scavengers include butyl hydroxy toluene (BHT) and mono-tert-butyl hydroquinone. The compositions exemplified comprise either BHT alone or MTBHQ. Also, nowhere it is mentioned that peroxygen bleach-containing compositions comprising a radical scavenger or mixtures thereof, allow to reduce the loss of tensile strength in fabrics and/or color damage of said fabrics, when said fabrics are pretreated with said compositions.

Co-pending European application 94870047.1 relates to highly acidic aqueous compositions containing persulfate and from 0.01% to 10% by weight of a radical scavenger, or mixtures thereof. Said radical scavengers include butyl hydroxy toluene (BHT), mono-tert-butyl hydroquinone, benzoic acid, toluic acid, t-butyl catechol, benzylamine and the like. The compositions exemplified in said patent application comprise only BHT alone. Also, nowhere it is mentioned that peroxygen bleach-containing compositions comprising a radical scavenger or mixtures thereof, allow to reduce the loss of tensile strength in fabrics and/or color damage of said fabrics, when said fabrics are pretreated with said compositions.

Co-pending European patent application 94870098.4 relates to bleaching compositions comprising a peroxygen bleach and a water-soluble cationic surfactant in combination with a hydrophilic nonionic surfactant. Said compositions may further comprise from 0.01% to 2% by weight of a radical scavenger or mixtures thereof, for stability purpose. Said radical scavengers include butyl hydroxy toluene (BHT), mono-tert-butyl hydroquinone benzoic acid, toluic acid, t-butyl catechol benzylamine and the like. None of the compositions exemplified comprises a radical scavenger nor mixtures thereof. Also, nowhere it is mentioned that peroxygen bleach-containing compositions comprising a radical scavenger or mixtures thereof, allow to reduce the loss of tensile strength in fabrics and/or color damage of said fabrics, when said fabrics are pretreated with said compositions.

Co-pending European patent application 95870018.9 discloses hydrogen peroxide-containing compositions comprising a compound chelating copper and/or iron and/or manganese, said compositions being particularly suitable to pretreat fabrics without damaging fabrics. Said compositions may further comprise from 0.001% to 0.09% by weight of a radical scavenger, or mixtures thereof. Said radical scavengers include butyl hydroxy toluene, hydroquinone, di-tert-butyl hydroquinone and the like. The compositions exemplified comprise only one radical scavenger, i.e. BHT at a level of 0.03% by weight of the total composition. Also, nowhere it is mentioned that peroxygen bleach-containing compositions comprising a radical scavenger or mixtures thereof, allow to reduce the loss of tensile strength in fabrics and/or color damage of said fabrics, when said fabrics are pretreated with said compositions.

SUMMARY OF THE INVENTION

In its broadest embodiment, the present invention encompasses the use of a liquid composition comprising a peroxygen bleach and a radical scavenger, for pretreating a soiled fabric before said fabric is washed, for reducing the loss of tensile strength in said fabric as well as the use of said liquid composition for pretreating a soiled colored fabric before said colored fabric is washed, for reducing the color damage of said fabric.

The present invention further encompasses a liquid composition comprising a peroxygen bleach and, as a radical scavenging system, at least 0.04% by weight of the total composition of an aromatic radical scavenger having only one —OH group directly linked on the aromatic ring and at least 0.01% by weight of the total composition of an aromatic radical scavenger having at least two —OH groups respectively disposed in ortho or para position.

DETAILED DESCRIPTION OF THE INVENTION

In its broadest embodiment, the present invention encompasses the use of a liquid composition comprising a peroxygen bleach and a radical scavenger, or mixtures thereof, for pretreating a soiled fabric before said fabric is washed, for reducing the loss of tensile strength in said fabric.

The present invention is based on the finding that, fabric damage resulting in tensile strength loss is reduced, when a liquid composition comprising a peroxygen bleach and a radical scavenger, or mixtures thereof, is used to pretreat a soiled fabric, as compared to the use of the same composition but without any radical scavenger, or mixtures thereof, to pretreat said fabric.

By "to pretreat soiled fabrics" it is to be understood that the liquid composition is applied in its neat form onto the soiled fabric and left to act onto said fabric before said fabric is washed.

In other words, the use of a peroxygen bleach-containing composition comprising a radical scavenger, or mixtures thereof, allows to considerably reduce the tensile strength loss caused by the presence of copper and/or iron and/or manganese and/or chromium on the fabric surface and/or by the exposure to UV radiation from sunlight of said fabric after having been contacted with said composition, even if said composition is left onto the fabric to be pretreated upon a prolonged period of time before washing said fabric, e.g. about 24 hours, and/or even if said fabric is contaminated by high levels of copper and/or iron and/or manganese and/or chromium, e.g. about 50 ppm of copper per gram of fabric, and/or even if said fabric is left under sunlight exposure for prolonged periods of time, e.g. about 12 hours.

The tensile strength loss of a fabric may be measured by employing the Tensile Strength method, as can be seen in the examples hereinafter. This method consists in measuring the tensile strength of a given fabric by stretching said fabric until it breakes. The force, expressed in Kg, necessary to break the fabric is the "Ultimate Tensile Stress" and may be measured with "The Stress-Strain INSTRON Machine". By "tensile strength loss" it is to be understood the difference when comparing the tensile strength of a fabric taken as a reference, i.e. a fabric which has not been pretreated, and the tensile strength of the same fabric after having been pretreated according to the present invention. A tensile strength loss of zero means that no fabric damage is observed.

In its broadest embodiment, the present invention further encompasses the use of a liquid composition comprising a peroxygen bleach and a radical scavenger, or mixtures thereof, for pretreating a soiled colored fabric before said colored fabric is washed, for reducing the color damage of said colored fabric.

Indeed, the present invention is further based on the finding that the color damage of some kinds of dyes present on colored fabrics, as bleach sensitive dyes or metallized dyes, i.e. the color change and/or decoloration, observed when pretreating such soiled colored fabrics with a peroxygen bleach-containing composition comprising a radical scavenger, or mixtures thereof, is reduced, as compared to the color change and/or decoloration observed when using the same composition but without any radical scavenger, or mixtures thereof. This color change and/or decoloration reduction is observed even if said composition is left onto the soiled colored fabrics upon prolonged periods of time before washing said fabrics, e.g. about 24 hours. In other words, the addition of a radical scavenger or mixtures thereof to a peroxygen bleach-containing composition suitable to be used as pretreaters allows to prevent the decomposition (oxydation) of dyes generally present on the surface of colored fabrics such as bleach sensitive dyes and/or metallized dyes including copper-formazan dyes and/or metal-azo dyes.

Also fabric tensile strength loss reduction and/or color damage reduction are obtained with liquid compositions according to the present invention comprising a peroxygen bleach and a radical scavenger, or mixtures thereof, without compromising on the bleaching performance nor on the stain removal performance delivered by said compositions.

As an essential element the compositions suitable to be used according to the present invention comprise a peroxygen bleach. Preferred peroxygen bleach is hydrogen peroxide, or a water soluble source thereof, or mixtures thereof. Hydrogen peroxide is most preferred to be used in the compositions according to the present invention. As used herein a hydrogen peroxide source refers to any compound which produces hydrogen peroxide when said compound is in contact with water.

Suitable water-soluble sources of hydrogen peroxide for use herein include percarbonates, persilicate, persulphate such as monopersulfate, perborates and peroxyacids such as diperoxydodecandioic acid (DPDA), magnesium perphthalic acid and mixtures thereof.

Typically, the compositions herein comprise from 0.5% to 20% by weight of the total composition of said peroxygen bleach, preferably from 2% to 15% and most preferably from 3% to 10%. Indeed, the presence of peroxygen bleach, preferably hydrogen peroxide provides strong cleaning benefits which are particularly noticeable in laundry applications.

As a second essential ingredient, the compositions suitable to be used according to the present invention comprise a radical scavenger, or mixtures thereof. Typically, the compositions herein comprise at least 0.04% by weight of the total composition of said radical scavenger, or mixtures thereof, preferably from 0.04% to 4.0%, more preferably from 0.05% to 1.0% and most preferably from 0.05% to 0.5%. Also suitable weight ratio of the peroxygen bleach to the radical scavenger or mixtures thereof in the liquid compositions herein for improved fabric safety and/or improved color safety when using said compositions as pretreaters is below 500, preferably below 300 and more preferably below 200.

Suitable radical scavengers for use herein include the well-known substituted mono and di hydroxy benzenes and derivatives thereof, alkyl- and aryl carboxylates and mixtures thereof. Preferred radical scavengers for use herein include di-tert-butyl hydroxy toluene, hydroquinone, di-tert-butyl hydroquinone, mono-tert-butyl hydroquinone, tert-butyl-hydroxy anysole, benzoic acid, toluic acid, catechol, t-butyl catechol, 2-methoxy-phenol, 2-ethoxy-phenol, 4-allyl-catechol, 2-methoxy-4-(2-propenyl)phenol, benzylamine, 1,1,3-tris(2-methyl-4-hydroxy-5-t-butylphenyl) butane, as well as n-propyl-gallate. Highly preferred for use herein is di-tert-butyl hydroxy toluene, which is for example commercially available from SHELL under the trade name IONOL CP®. These radical scavengers further contribute to the stability of the peroxygen bleach-containing compositions herein.

In another embodiment the present invention further encompasses liquid compositions comprising a peroxygen bleach and a radical scavenging system, i.e. at least 0.04% by weight of the total composition of an aromatic radical scavenger having only one —OH group directly linked on the aromatic ring and at least 0.01% by weight of the total composition of an aromatic radical scavenger having at least two —OH groups respectively disposed in ortho or para position.

Preferably said liquid compositions of the present invention comprise, as said radical scavenging system, from 0.04% to 4% by weight of the total composition of said aromatic radical scavenger having only one -OH group on the ring, more preferably from 0.05% to 2% and most preferably from 0.05% to 1.5%, and from 0.01% to 2% by weight of said aromatic radical scavenger having at least two —OH groups respectively disposed in ortho or para position, more preferably from 0.02% to 0.5% and most preferably from 0.03% to 0.3%.

By "aromatic radical scavenger" it is meant herein an unsaturated mono- or poly-aromatic ring system comprising from 4 to 14 carbon atoms, preferably from 4 to 10 and more preferably from 4 to 6, and optionally one or more etheroatoms preferably selected from the group of nitrogen, oxygen, sulphur or mixtures thereof, and having a double bond set comprising a total of 4n+2 electrons, wherein n is an integer of from 1 to 3, preferably of from 1 to 2.

Suitable aromatic radical scavenger having only one —OH group directly linked on the aromatic ring herein include aromatic radical scavenger as defined herein before having only one substituent, i.e. a —OH group, as well as aromatic radical scavengers as defined herein before having several substituents, only one of them being an —OH group the other substituents being one of the following groups: linear alkyl chains as $—CH_2)_n—CH_3$, secondary alkyl chains as —CHRR', tertiary alkyl chains as —CRR'R", alkyloxy groups as —O—R wherein $R=—(CH_2)_n—CH_3$, $R'=—(CH_2)_m—CH_3$ and $R"=—(CH_2)_p—CH_3$, and n, m and p are integer of from 0 to 4, primary ($—NH_2$), secondary (—NRH), and tertiary ($—NR_2$) aminic groups, aldehydic groups (—CHO), carboxylic groups (—COOH), sulphonic groups ($—SO_3H$) and substituted or unsubstituted phenilic groups.

Accordingly suitable aromatic radical scavengers having only one —OH group directly linked on the aromatic ring to be used herein include di-tert-butylhydroxy toluene (BHT), tert-butyl-hydroxy anysole, p-hydroxy-toluene, p-hydroxy-anysole, tert-butyl-hydroxy anyline and p-hydroxy anyline. Di-tert-butyl hydroxy toluene (BHT) is highly preferred herein and may be commercially available for example from SHELL under the name IONOL CP®.

Suitable aromatic radical scavenger having at least two —OH groups respectively disposed in para or ortho position herein include aromatic radical scavengers as defined herein before having only two substituents, i.e. two —OH groups, as well as aromatic radical scavengers as defined hereinbefore having more than two substituents, two of them being an —OH group the other substituents being any of the following groups: —OH, linear alkyl chains as $—(CH_2)_n—CH_3$, secondary alkyl chains as —CHRR', tertiary alkyl chains as —CRR'R", alkyloxy groups as —O—R wherein $R=—(CH_2)_n—CH_3$, $R'=—(CH_2)_m—CH_3$ and $R"=—(CH_2)_p—CH_3$ and n, m and p are integer of from 0 to 4, primary ($—NH_2$), secondary (—NRH), and tertiary ($—NR_2$) aminic groups, aldehydic groups (—CHO), carboxylic groups (—COOH), sulphonic groups ($—SO_3H$) and substituted or unsubstituted phenilic groups.

Suitable aromatic radical scavenger having at least two —OH groups respectively disposed in ortho or para position to be used herein include hydroquinone (HQ) and derivatives thereof, catechol and derivatives thereof or mixture thereof. Suitable derivatives of hydroquinone include di-tert-butyl hydroquinone (DTBHQ), monotert-butyl hydroquinone (MTBHQ), 2,5-dihydroxybenzoic acid, 2,5-dihydroxyterephtalic acid and di-alkyl hydroquinones sulphonated. Suitable derivatives of catechol include t-butyl catechol, 4-allyl catechol, 4-acetyl catechol, 3,4-dihydroxy benzaldehyde and 2,3-dihydroxy benzaldehyde.

Highly preferred aromatic radical scavengers having at least two —OH respectively disposed in ortho or para position are mono tert-butyl hydroquinone (MTBHQ), hydroquinone (HQ) and catechol or mixtures thereof. Mono tert-butyl hydroquinone (MTBHQ) may be commercially available for example from EASTMAN CHEMICAL under the name MTBHQ® and hydroquinone (HQ) may be commercially available for example from EASTMAN CHEMICAL under the name HQ®.

It has unexpectedly been found that there is a synergistic effect on fabric safety and color safety associated to the radical scavenging system of the present invention comprising at least 0.04% by weight of the total composition of an aromatic radical scavenger having only one —OH group directly linked on the aromatic ring and at least 0.01% by weight of an aromatic radical scavenger having at least two —OH groups respectively disposed in ortho or para position, when pretreating a soiled fabric with a peroxygen bleach-containing composition comprising said radical scavenging system as compared to a pretreatment wherein only one of said radical scavenger is used. This synergistic effect is illustrated hereinafter in the experimental data.

The compositions according to the present invention are aqueous liquid cleaning compositions. Said aqueous compositions have a pH as is of from 1 to 9, preferably from 2 to 6 and more preferably from 3 to 5. The pH of the compositions can be adjusted by using organic or inorganic acids, or alkalinising agents.

The compositions herein may comprise a chelating agent as a highly preferred optional ingredient. Suitable chelating agents may be any of those known to those skilled in the art such as the ones selected from the group comprising phosphonate chelating agents, amino carboxylate chelating agents or other carboxylate chelating agents, or polyfunctionally-substituted aromatic chelating agents or mixtures thereof.

Such phosphonate chelating agents may include etidronic acid (1-hydroxyethylidene-bisphosphonic acid or HEDP) as well as amino phosphonate compounds, including amino alkylene poly (alkylene phosphonate), alkali metal ethane 1-hydroxy diphosphonates, nitrilo trimethylene phosphonates, ethylene diamine tetra methylene phosphonates, and diethylene triamine penta methylene phosphonates. The phosphonate compounds may be present either in their acid form or as salts of different cations on some or all of their acid functionalities. Preferred phosphonate chelating agents to be used herein are diethylene triamine penta methylene phosphonates. Such phosphonate chelants are commercially available from Monsanto under the trade name DEQUEST®.

Polyfunctionally-substituted aromatic chelating agents may also be useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene. A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987 to Hartman and Perkins. Ethylenediamine N,N'-disuccinic acid is, for instance, commercially available under the tradename ssEDDS® from Palmer Research Laboratories.

Suitable amino carboxylate chelating agents useful herein include ethylene diamine tetra acetates, diethylene triamine pentaacetates, diethylene triamine pentoacetate (DTPA), N-hydroxyethylethylenediamine triacetates, nitrilotriacetates, ethylenediamine tetraproprionates, triethylenetetraaminehexaacetates, ethanoldiglycines, propylene diamine tetracetic acid (PDTA) and methyl glycine di-acetic acid (MGDA), both in their acid form, or in their alkali metal, ammonium, and substituted ammonium salt forms. Particularly suitable to be used herein are diethylene triamine penta acetic acid (DTPA), propylene diamine tetracetic acid (PDTA) which is, for instance, commercially available from BASF under the trade name Trilon FS® and methyl glycine di-acetic acid (MGDA).

Further carboxylate chelating agents to be used herein includes malonic acid, salicylic acid, glycine, aspartic acid, glutamic acid, or mixtures thereof.

The chelating agents mentioned herein are particularly suitable to be used herein as they further contribute to reduce the tensile strength loss. Accordingly highly preferred chelating agents to be used herein include propylene diamine tetracetic acid (PDTA), methyl glycine di-acetic acid (MGDA), diethylene triamine penta acetic acid (DTPA), diethylene triamine penta methylene phosphonate, ethylenediamine N,N'-disuccinic acid (S,S-EDDS), salicylic acid, malonic acid, etidronic acid (1-hydroxyethylidene-bisphosphonic acid or HEDP), or mixtures thereof.

Typically, the compositions according to the present invention comprise up to 5% by weight of the total composition of a chelating agent, or mixtures thereof, preferably from 0.01% to 1.5% by weight and more preferably from 0.01% to 0.5%.

The compositions of the present invention may further comprise any surfactant known to those skilled in the art including nonionic, anionic, cationic, zwitterionic and/or amphothereic surfactants.

Accordingly, the compositions of the present invention further comprise a nonionic surfactant, or mixtures thereof. Typically, the compositions according to the present invention comprise from 0.1% to 50% by weight of the total composition of said nonionic surfactant, or mixtures thereof, preferably from 0.3% to 30% and more preferably from 0.4% to 25%.

Suitable nonionic surfactants to be used herein are fatty alcohol ethoxylates and/or propoxylates which are commercially available with a variety of fatty alcohol chain lengths and a variety of ethoxylation degrees. Indeed, the HLB values of such alkoxylated nonionic surfactants depend essentially on the chain length of the fatty alcohol, the nature of the alkoxylation and the degree of alkoxylation. Surfactant catalogues are available which list a number of surfactants, including nonionics, together with their respective HLB values.

Suitable chemical processes for preparing the nonionic surfactants for use herein include condensation of corresponding alcohols with alkylene oxide, in the desired proportions. Such processes are well known to the man skilled in the art and have been extensively described in the art. As an alternative, a great variety of alkoxylated alcohols suitable for use herein is commercially available from various suppliers.

Particularly suitable to be used herein as nonionic surfactants are hydrophobic nonionic surfactants having an HLB (hydrophilic-lipophilic balance) below 16, preferably below 15, more preferably below 12, and most preferably below 10. Those hydrophobic nonionic surfactants have been found to provide good grease cutting properties.

Preferred hydrophobic nonionic surfactants to be used in the compositions according to the present invention are surfactants having an HLB below 16 and being according to the formula $RO—(C_2H_4O)_n(C_3H_6O)_mH$, wherein R is a $C_6$ to $C_{22}$ alkyl chain or a $C_6$ to $C_{28}$ alkyl benzene chain, and wherein n+m is from 0 to 20 and n is from 0 to 15 and m is from 0 to 20, preferably n+m is from 1 to 15 and, n and m are from 0.5 to 15, more preferably n+m is from 1 to 10 and, n and m are from 0 to 10. The preferred R chains for use herein are the $C_8$ to $C_{22}$ alkyl chains. Accordingly suitable hydrophobic nonionic surfactants for use herein are Dobanol$^R$ 91-2.5 (HLB=8.1; R is a mixture of C9 and $C_{11}$ alkyl chains, n is 2.5 and m is 0), or Lutensol$^R$ TO3 (HLB=8; R is a $C_{13}$ alkyl chains, n is 3 and m is 0), or Lutensol$^R$ AO3 (HLB=8; R is a mixture of $C_{13}$ and $C_{15}$ alkyl chains, n is 3 and m is 0), or Tergitol$^R$ 25L3 (HLB=7.7; R is in the range Of $C_{12}$ to $C_{15}$ alkyl chain length, n is 3 and m is 0), or Dobanol$^R$ 23-3 (HLB=8.1; R is a mixture Of $C_{12}$ and $C_{13}$ alkyl chains, n is 3 and m is 0), or Dobanol$^R$ 23-2 (HLB=6.2; R is a mixture of $C_{12}$ and $C_{13}$ alkyl chains, n is 2 and m is 0), or Dobanol$^R$ 45-7 (HLB=11.6; R is a mixture of $C_{14}$ and $C_{15}$ alkyl chains, n is 7 and m is 0) Dobanol$^R$ 23-6.5 (HLB=11.9; R is a mixture of $C_{12}$ and $C_{13}$ alkyl chains, n is 6.5 and m is 0), or Dobanol$^R$ 25-7 (HLB=12; R is a mixture Of $C_{12}$ and $C_{15}$ alkyl chains, n is 7 and m is 0), or Dobanol$^R$ 91-5 (HLB=11.6; R is a mixture of $C_9$ and $C_{11}$ alkyl chains, n is 5 and m is 0), or Dobanol$^R$ 91-6 (HLB=12.5; R is a mixture of $C_9$ and $C_{11}$ alkyl chains, n is 6 and m is 0), or Dobanol$^R$ 91-8 (HLB=13.7; R is a mixture of $C_9$ and $C_{11}$ alkyl chains, n is 8 and m is 0), Dobanol$^R$ 91-10 (HLB=4.2; R is a mixture of $C_9$ to $C_{11}$ alkyl chains, n is 10 and m is 0), or mixtures thereof. Preferred herein are Dobanol$^R$ 91-2.5, or Lutensol$^R$ TO3, or Lutensol$^R$ AO3, or Tergitol$^R$ 25L3, or Dobanol$^R$ 23-3, or Dobanol$^R$ 23-2, or mixtures thereof. These Dobano$^R$ surfactants are commercially available from SHELL. These Lutenso$^R$ surfactants a re commercially available from BASF and these Tergitol$^R$ surfactants are commercially available from UNION CARBIDE.

Preferred herein the compositions according to the present invention further comprise an anionic surfactant, or mixtures thereof. Said anionic surfactants which are hydrophilic compounds act together with the hydrophobic surfactants such as to counterbalance the negative effect of hydrophobic surfactants. Said anionic surfactants act as wetting agent, i.e. in laundry application they wet the stains on the fabrics, especially on hydrophilic fabrics, and thus help hydrogen peroxide to perform its bleaching action thereby contributing to improved laundry performance on bleachable stains. Furthermore, the anionic surfactants of the present invention allow to obtain clear compositions even when said compositions comprise hydrophobic ingredients such as hydrophobic surfactants. Typically, the compositions according to the present invention comprise from 0.1% to 20% by weight of the total composition of said anionic surfactant, or mixtures thereof, preferably from 0.2% to 15% a nd more preferably from 0.5% to 13%.

Particularly suitable to be used in the present invention are sulfonate and sulfate surfactants. The like anionic surfactants are well-known in the art and have found wide application in commercial detergents. These anionic surfactants include the C8–C22 alkyl benzene sulfonates (LAS), the C8–C22 alkyl sulfates (AS), unsaturated sulfates such as oleyl sulfate, the C10–C18 alkyl alkoxy sulfates (AES) and the C10–C18 alkyl alkoxy carboxylates. The neutralising cation for the anionic synthetic sulfonates and/or sulfates is represented by conventional cations which are widely used in detergent technology such as sodium, potassium or alkanolammonium. Preferred herein are the alkyl sulphate, especially coconut alkyl sulphate having from 6 to 18 carbon atoms in the alkyl chain, preferably from 8 to 15, or mixtures thereof.

The compositions suitable to be used according to the present invention may further comprise a foam suppressor such as 2-alkyl alkanol, or mixtures thereof, as a highly preferred optional ingredient. Particularly suitable to be used in the present invention are the 2-alkyl alkanols having an alkyl chain comprising from 6 to 16 carbon atoms, preferably from 8 to 12 and a terminal hydroxy group, said alkyl chain being substituted in the α position by an alkyl chain comprising from 1 to 10 carbon atoms, preferably from 2 to 8 and more preferably 3 to 6. Such suitable compounds are commercially available, for instance, in the Isofol® series such as Isofol® 12 (2-butyl octanol) or Isofol® 16 (2-hexyl decanol). Typically, the compositions suitable to be used herein comprise from 0.05% to 2% by weight of the total composition of a 2-alkyl alkanol, or mixtures thereof, preferably from 0.1% to 1.5% and most preferably from 0.1% to 0.8%.

The compositions herein may further comprise a variety of other optional ingredients such as builders, stabilisers, bleach activators, soil suspenders, dye transfer agents, solvents, brighteners, perfumes, and dyes.

Although preferred application of the compositions described herein is laundry pretreatment, the compositions according to the present invention may also be used as a laundry detergent or as a laundry detergent booster as well as a household cleaner in the bathroom or in the kitchen. When used as hard surface cleaners, such compositions are easy to rinse and provide good shine characteristics on the cleaned surfaces.

Suitable process of pretreating soiled fabrics with a liquid composition comprising a peroxygen bleach and a radical scavenger, or mixtures thereof, is for example a process which comprises the steps of applying said composition in its neat form onto the fabric and allowing said composition to remain in contact with said fabric preferably without leaving said composition to dry onto said fabric, before said fabric is washed. Said composition may remain in contact with said fabric, typically for a period of 1 minute to 24 hours, preferably 1 minute to 1 hour and more preferably 5 minutes to 30 minutes. Optionally, when the fabric is soiled with encrusted stains/soils which otherwise would be relatively difficult to remove, the compositions according to the present invention may be rubbed and/or brushed more or less intensively, for example, by means of a sponge or a brush or simply by rubbing two pieces of fabric against each other.

By "washing" it is to be understood herein to simply rinse the fabrics with water, or the fabrics may be washed with conventional compositions comprising at least one surface active agent, this by means of a washing machine or simply by hand.

By "in its neat form" it is to be understood that the compositions described herein are applied directly onto the fabrics to be pretreated without undergoing any dilution.

In a process of pretreating soiled fabrics particularly suitable to be used herein, the liquid compositions should preferably not be left to dry onto the fabrics. Indeed, it has been found that water evaporation contributes to increase the concentration of free radicals onto the surface of the fabrics and, consequently, the rate of chain reaction. It is also speculated that an autooxidation reaction occurs upon evaporation of water when the liquid compositions are left to dry onto the fabrics. Said reaction of auto-oxidation generates peroxy-radicals which may contribute to the degradation of cellulose. Thus, not leaving the liquid compositions, as described herein, to dry onto the fabric, in a process of pretreating soiled fabrics, contributes to the benefits according the present invention, i. e. to reduce the tensile strength loss when pretreating fabrics with liquid peroxygen bleach-containing compositions.

The present invention will be further illustrated by the following examples.

Experimental data

A) Tensile strength test method

The following compositions were made by mixing the listed ingredients in the listed proportions (weight % unless otherwise specified).

| Compositions | I | II | III | IV | V | VI |
|---|---|---|---|---|---|---|
| Alkylsulphate | 1.2 | 1.2 | 1.2 | 1.2 | 1.2 | 1.2 |
| Dobanol ® 91-10 | 1.6 | 1.6 | 1.6 | 1.6 | 1.6 | 1.6 |
| Dobanol ® 23-3 | 1.1 | 1.1 | 1.1 | 1.1 | 1.1 | 1.1 |
| DETPMP | 0.18 | 0.18 | 0.18 | 0.18 | 0.18 | 0.18 |
| $H_2O_2$ | 7.0 | 7.0 | 7.0 | 7.0 | 7.0 | 7.0 |
| Isofol ® 12 | 0.5 | 0.5 | 0.5 | 0.5 | 0.5 | 0.5 |
| BHT | — | 0.5 | 1.0 | 2.0 | 1.0 | 1.0 |
| MTBHQ | — | — | — | — | 0.09 | — |

-continued

| Compositions | I | II | III | IV | V | VI |
|---|---|---|---|---|---|---|
| HQ | — | — | — | — | — | 0.09 |
| Water and minors | | | up to 100% | | | |
| H2SO4 up to pH 4 | | | | | | |
| Tensile strength loss (%) | 42 | 18 | 20 | 14 | 2 | 6 |

50 ppm Copper per gram of fabric
Pretreatment 24 hours
DETPMP is diethylene triamine penta methylene phosphonate marketed by Monsanto under the trade name DEQUEST ®.
MTBHQ is mono tert-butyl hydroquinone marketed by EASTMAN CHEMICALS under the trade name MTBHQ ®.
HQ is hydroquinone marketed by EASTMAN CHEMICALS under the trade name HQ ®.
BHT is di-tert-butyl-hydroxy toluene marketed by SHELL under the trade name IONOL CP ®.

Composition I is taken as a reference; it comprises hydrogen peroxide and is free of any radical scavenger. Composition II to VI are representative of the present invention, they comprise hydrogen peroxide and a radical scavenger or mixtures thereof.

The following test was carried out:

A tensile strength test method was carried out with the compositions mentioned hereinabove. This test method was carried out on metal-polluted fabrics.

Cotton ribbons (dimension 12.5×5 $cm^2$) having a copper concentration of 50 ppm per gram of cotton were pretreated according to the present invention. Indeed, the cotton ribbons were pretreated with 2 ml of each of the liquid compositions mentioned herein before. The compositions were left in contact with the ribbons for 24 hours, before being rinsed with water. After that, the damage on the fabrics, i.e. cotton ribbons, was evaluated by stretching said ribbons until they broke. The force necessary to break the ribbons, i.e. the Ultimate Tensile Stress, was measured, in wet conditions, with “The Stress-Strain INSTRON Machine”. The lower the force needed to break said cotton ribbons, the more serious is the damage caused on the fabrics. A good confidence (standard deviation=2–4 Kg) on the results is obtained using five replicates for each test.

The tensile strength loss mentioned above for the different compositions tested is expressed in percentage and is obtained by comparing the tensile strength of a given fabric taken as a reference, i.e. a fabric which has not been pretreated, to the tensile strength of the same fabric measured after said fabric has been pretreated as mentioned hereinbefore.

The above results clearly show the unexpected fabric safety improvement, i.e. reduction of tensile strength loss, obtained by using liquid compositions according to the present invention comprising a peroxygen bleach and a radical scavenger or mixtures thereof, as compared to the use of the same composition but without any radical scavenger (composition I).

More particularly the above results surprisingly show the synergistic effect of the use of a radical scavenging system according to the present invention in a peroxygen bleach-containing composition on fabric safety when pretreating fabrics with said composition. Indeed, there is virtually no tensile strength loss observed when pretreating fabrics with compositions according to the present invention comprising said radical scavenging system (see in particular compositions V and VI versus compositions I to IV), this even upon a long contact period, i.e. 24 hours and in presence of a high concentration of copper on the surface of said fabrics, i.e. 50 ppm per gram of cotton fabric.

B) Color safety test method

The following compositions were made by mixing the listed ingredients in the listed proportions (weight % unless otherwise specified).

| Compositions | I | II | III | IV |
|---|---|---|---|---|
| Alkylsulphate | 1.2 | 1.2 | 1.2 | 1.2 |
| Dobanol ® 91-10 | 1.6 | 1.6 | 1.6 | 1.6 |
| Dobanol ® 23-3 | 1.1 | 1.1 | 1.1 | 1.1 |
| $H_2O_2$ | 7.0 | 7.0 | 7.0 | 7.0 |
| Isofol ® 12 | 0.5 | 0.5 | 0.5 | 0.5 |
| DTPA | 0.1 | 0.1 | 0.1 | 0.1 |
| BHT | — | 0.3 | 0.1 | 0.1 |
| HQ | — | — | 0.1 | — |
| MTBHQ | — | — | — | 0.1 |
| Water and minors | | up to 100% | | |
| H2SO4 up to pH 4 | | | | |

DTPA is diethylene triamine penta acetic acid.
MTBHQ is mono tert-butyl hydroquinone marketed by EASTMAN CHEMICALS under the trade name MTBHQ ®.
HQ is hydroquinone marketed by EASTMAN CHEMICALS under the trade name HQ ®.
BHT is di-tert-butyl-hydroxy toluene marketed by SHELL under the trade name IONOL CP ®.

Composition I is taken as a reference; it comprises hydrogen peroxide and is free of any radical scavenger. Composition II to IV are representative of the present invention, they comprise hydrogen peroxide and a radical scavenger or mixtures thereof.

The following test method was carried out:

Color safety tests were carried out to assess the dye damaging action of the compositions I to IV, mentioned hereinabove.

Cotton swatches colored with direct blue 1 as well as cotton swatches colored with reactive purple were pretreated with 1 ml of each composition leaving it in contact with said swatches for 24 hours, before being rinsed with water. Said colored swatches are commercially available from Empirical manufacturing company, Cincinnati. The damage (discoloration or hue change) was evaluated by visual grading and by instrumental methods with the “HunterLab Tristimulus MINISCAN”.

The results were as follows:

Color damage on bleach sensitive dyes

| | Compositions | | | |
|---|---|---|---|---|
| Colors | I | II | III | IV |
| Direct Blue 1 | S | — | — | — |
| Reactive Purple | VS | — | — | — |

Color Damage after 24 h pretreatment:
VS = Very Strong, S = Strong, M = Medium, L = Light, — = No Damage The above results clearly show the unexpected color safety improvement, i.e. reduction of discoloration and/or hue change of colored fabrics, obtained by using liquid compositions according to the present invention comprising a peroxygen bleach and a radical scavenger or mixtures thereof, as compared to the use of the same composition but without any radical scavenger (composition I).

EXAMPLES

Following compositions were made by mixing the listed ingredients in the listed proportions (weight % unless otherwise specified).

| Compositions | I | II | III | IV | V | VI |
|---|---|---|---|---|---|---|
| Alkylsulphate | 1.2 | 1.2 | 1.2 | 1.2 | 1.2 | 1.2 |
| Dobanol ® 91-10 | 1.6 | 1.6 | 1.6 | 1.6 | 1.6 | 1.6 |
| Dobanol ® 23-3 | 1.1 | 1.1 | 1.1 | 1.1 | 1.1 | 1.1 |
| $H_2O_2$ | 7.0 | 7.0 | 7.0 | 7.0 | 7.0 | 7.0 |
| Isofol ® 12 | 0.5 | 0.5 | 0.5 | 0.5 | 0.5 | 0.5 |
| DTPA | 0.1 | — | 0.1 | — | 0.1 | — |
| HEDP | — | 0.18 | — | 0.18 | — | 0.18 |
| BHT | 0.1 | 0.1 | 0.3 | 0.3 | 0.1 | 0.1 |
| HQ | — | — | — | — | 0.1 | 0.1 |
| Water and minors | | | up to 100% | | | |
| H2SO4 up to pH 4 | | | | | | |

| Compositions | VII | VIII |
|---|---|---|
| Alkylsulphate | 2.0 | 12 |
| Dobanol ® 45-7 | 8.6 | — |
| Dobanol ® 23-3 | 6.4 | 12 |
| ATC | 3.5 | 3.5 |
| $H_2O_2$ | 6.0 | 6.0 |
| BHT | 0.1 | 0.1 |
| HQ | 0.1 | 0.1 |
| Water and minors | up to 100% | |
| H2SO4 up to pH 4 | | |

DTPA is diethylene triamine penta acetic acid.
HQ is hydroquinone marketed by EASTMAN CHEMICALS under the trade name HQ ®.
BHT is di-tert-butyl-hydroxy toluene marketed by SHELL under the trade name IONOL CP ®.
HEDP is etidronic acid.
ATC is acetyl triethyl citrate.

Compositions I to VIII when used to pretreat soiled colored fabrics exhibit excellent fabric safety as well as good color safety to the fabrics pretreated therewith, this even when leaving said compositions to act onto the fabrics for prolonged time, e.g. 24 hours, before washing said fabrics and even leaving the product to form a border between pretreated and not-pretreated areas of said fabric. This border is usually the more damaged region of a metal polluted cotton fabric or of a colored item.

What is claimed is:

1. A liquid composition consisting essentially of 0.5% to 20% by weight of a peroxygen bleach, a radical scavenging system including from 0.04% to 4% by weight of the total composition of an aromatic radical scavenger having only one —OH group directly linked on the aromatic ring, and from 0.01% to 2% by weight of the total composition of an aromatic radical scavenger having at least two —OH groups respectively disposed in ortho or para position, and a chelating agent.

2. A composition according to claim 1 wherein said compositions comprises as said radical scavenging system, from about 0.05% to about 2% by weight of the total composition of said aromatic radical scavenger having only one —OH group directly linked on the aromatic ring, or mixtures thereof and from about 0.02% to about 0.5% by weight of the total composition of said aromatic radical scavenger having at least two —OH respectively disposed in ortho or para position.

3. A composition according to claim 1 wherein said aromatic radical scavenger having only one —OH group linked on the aromatic ring is di-tert butyl hydroxy toluene and wherein said aromatic radical scavenger having at least two —OH groups respectively disposed in ortho or para position is hydroquinone, mono tert-butyl hydroquinone, catechol or mixtures thereof.

4. A composition according to claim 1 wherein said composition has a pH of from about 1 to about 9.

5. A composition according to claim 1 wherein said chelating agent is selected from the group consisting of phosphonate chelating agents, amino carboxylate chelating agents or other carboxylate chelating agents, polyfunctionally-substituted aromatic chelating agents, and mixtures thereof.

6. A method for pretreating a soiled fabric before said fabric is washed comprising contacting said fabric with a liquid composition consisting essentially of 0.5% to 20% by weight of a peroxygen bleach, a radical scavenging system including from 0.04% to 4% by weight of the total composition of an aromatic radical scavenger having only one —OH group directly linked on the aromatic ring, and from 0.01% to 2% by weight of the total composition of an aromatic radical scavenger having at least two —OH groups respectively disposed in ortho or para position, and a chelating agent, such that the loss of tensile strength in said fabric as a result of washing is reduced.

7. The method according to claim 6 wherein one or more of said aromatic radical scavengers of said radical scavenging system is selected from the group consisting of substituted mono- or di-hydroxy benzene or derivatives thereof.

8. The method according to claim 6 wherein one or more of said aromatic radical scavengers of said radical scavenging system is selected from the group consisting of di-tert-butyl hydroxy toluene, hydroquinone, di-tert-butyl hydroquinone, mono-tert-butyl hydroquinone, and mixtures thereof.

9. The method according to claim 6 wherein said peroxygen bleach is hydrogen peroxide or a water soluble source thereof.

10. The method according to claim 6 wherein said composition has a pH of from 1 to 9.

11. The method according to claim 6, wherein said chelating agent is selected from the group consisting of phosphonate chelating agents, amino carboxylate chelating agents or other carboxylate chelating agents, polyfunctionally-substituted aromatic chelating agents, or mixtures thereof.

* * * * *